United States Patent
Dashiff

(10) Patent No.: US 6,782,002 B1
(45) Date of Patent: Aug. 24, 2004

(54) APPARATUS FOR MULTIPLEXING MULTIPLE E1 CIRCUITS OVER MULTIPLE T1 CIRCUITS

(75) Inventor: Ethan I. Dashiff, Passaic, NJ (US)

(73) Assignee: AT&T Corp., New York, NY (US)

( * ) Notice: Subject to any disclaimer, the term of this patent is extended or adjusted under 35 U.S.C. 154(b) by 765 days.

(21) Appl. No.: 09/618,539

(22) Filed: Jul. 18, 2000

(51) Int. Cl.$^7$ ................................................. H04J 3/16

(52) U.S. Cl. ...................................... 370/466; 370/535

(58) Field of Search ............................... 370/464, 465, 370/466, 467, 470, 472, 476, 532, 535, 536, 542, 544

(56) References Cited

U.S. PATENT DOCUMENTS

| | | | |
|---|---|---|---|
| 5,077,735 A | * 12/1991 | Myung et al. | 370/467 |
| 5,251,210 A | * 10/1993 | Mann et al. | 370/519 |
| 5,526,397 A | * 6/1996 | Lohman | 455/560 |
| 5,799,019 A | * 8/1998 | Kim et al. | 370/465 |
| 5,923,667 A | * 7/1999 | Poiraud et al. | 370/515 |
| 5,999,539 A | * 12/1999 | Dashiff et al. | 370/465 |
| 6,122,288 A | * 9/2000 | Dashiff et al. | 370/465 |

OTHER PUBLICATIONS

RAD Data Communications, IMX–4T1, T1 Inverse Multiplexer, pp. 1–A10, 1999.*
Digital Link Corporation, IMUX Fundamentals, pp. 1–60, 1999.*

* cited by examiner

*Primary Examiner*—Frank Duong

(57) ABSTRACT

A system which enables a customer to obtain E1 access between the customer's premises (CP) and an E1-compatible network when the customer is unable to obtain an E1 line between the CP and the network is disclosed. A single multiplexer at a customer premises (CP) and a single multiplexer at a network point of presence (POP) are utilized to provide E1 access between the CP and the network POP. Each multiplexer comprises three E1 interfaces and four T1 interfaces. One E1 line is connected to each of the three E1 interfaces of the CP multiplexer. Similarly, one E1 line from an E1-compatible network is connected to each of the three E1 interfaces of the POP multiplexer. Each of the four T1 interfaces of the CP multiplexer is connected to one of the four T1 interfaces of the POP multiplexer. The CP multiplexer receives data from the three E1 lines and maps this data onto the four T1 lines. The POP multiplexer receives the data from the four T1 lines and maps the data onto three network E1 lines. In a similar manner, the CP multiplexer and the POP multiplexer enable E1 format data to flow from the network POP to the CP.

7 Claims, 1 Drawing Sheet

APPARATUS FOR MULTIPLEXING MULTIPLE E1 CIRCUITS OVER MULTIPLE T1 CIRCUITS

BACKGROUND

The present invention relates generally to providing a customer with a first type of access to a network when lines that typically provide the desired access are not available between the customer's premises (CP) and a point of presence (POP) (or central office (CO)) associated with the network. More particularly, the present invention relates to utilizing a single multiplexer at a CP to map two or more lines of the first type of data onto three or more lines that typically provide another service and utilizing a single multiplexer at a network POP (or CO) to receive the data from the three or more lines that typically provide another service and map the data back onto the original number of lines.

In Europe, the most popular standard for transmitting digital voice data is known as E1. E1 was devised by the International Telecommunications Union—Telecommunication Standardization Sector (ITU-T). The name E1 was given by the Conference of European Postal and Telecommunication Administration (CEPT). In accordance with the E1 standard, 32 standardized 64 Kbps channels (also referred to herein as "timeslots") carry digital data at a rate of 2.048 Mbps. In the United States, the most popular standard for transmitting digital voice data is known as T1. T1 was introduced by the Bell System in the 1960's. In accordance with the T1 standard, 24 standardized 64 Kbps channels carry digital data at a rate of 1.544 Mbps.

Although many networks in the United States (such as the AT&T network) are able to accommodate the transmission of E1 format data, many customers in the United States are unable to obtain an E1 line between their CP and a POP or CO associated with these E1-compatible networks. The United States customer may desire an E1 line so that they might transmit E1 format data from their CP to a location in Europe. One known solution to this problem is to provision two T1 lines between the CP and the POP for each desired E1 line. A first multiplexer at the CP puts an E1 onto the two T1s. A second multiplexer at the POP recreates the E1 from the two T1 lines. Thus, 48 T1 channels are utilized to transport 32 E1 channels between the CP and the POP. With this solution, managing the number of T1s and multiplexers becomes more burdensome as the number of E1 s increases. For three E1s, for example, six T1s and six dedicated multiplexers (three at the CP and three at the POP) are required and 144 data channels of the six T1 s are used to transport the 96 channels of the three E1 s.

Another current solution is to provision a T3 (45 MB) line between the network POP and the CP, utilize a multiplexer at the CP to put the E1 data onto the T3, and utilize a second multiplexer at the POP to extract the E1 data from the T3. The extracted E1 data is then transported over the network. One of the drawbacks of this solution is the monetary cost. Even without factoring in the monetary cost of the multiplexers, this solution is not cost-effective when less than eight E1 lines are involved.

Yet another known solution is to provision T1 lines between the CP and the POP, install a cross-connect box at the CP, use the cross-connect box to connect each individual channel of each E1 line to a corresponding mapped channel of the provisioned T1 lines, and (at the POP or elsewhere in the network) cross-connect the T1 channels to E1 channels. In addition to being highly complex and monetarily expensive, this solution requires implementing a service not currently provided by the long-distance carrier.

In view of the above, it can be appreciated that there is a need for a method and apparatus which solves the above described problems.

SUMMARY OF THE INVENTION

According to one embodiment of the present invention, a single multiplexer at a customer premises (CP) and a single multiplexer at a network point of presence (POP) are utilized to provide E1 access between the CP and the network POP. Each multiplexer comprises three E1 interfaces and four T1 interfaces. One separate E1 line from the CP is connected to each of the three E1 interfaces of the CP multiplexer. Similarly, one E1 line from an E1-compatible network is connected to each of the three E1 interfaces of the POP multiplexer. Each of the four T1 interfaces of the CP multiplexer is connected to one of the four T1 interfaces of the POP multiplexer. The CP multiplexer receives data from the three CP E1 lines and maps this data onto the four T1 lines. The POP multiplexer receives the data from the four T1 lines and maps the data onto three network E1 lines. In a similar manner, the CP multiplexer and the POP multiplexer enable E1 format data to flow from the network POP to the CP.

DETAILED DESCRIPTION

The present invention relates to a system which enables a customer to obtain E1 access between the customer's premises (CP) and an E1-compatible network when the customer is unable to obtain an E1 line between the CP and the network. The system comprises a single multiplexer at a customer premises (CP) and a single multiplexer at a point of presence (POP) associated with the E1-compatible network.

Figure 1:
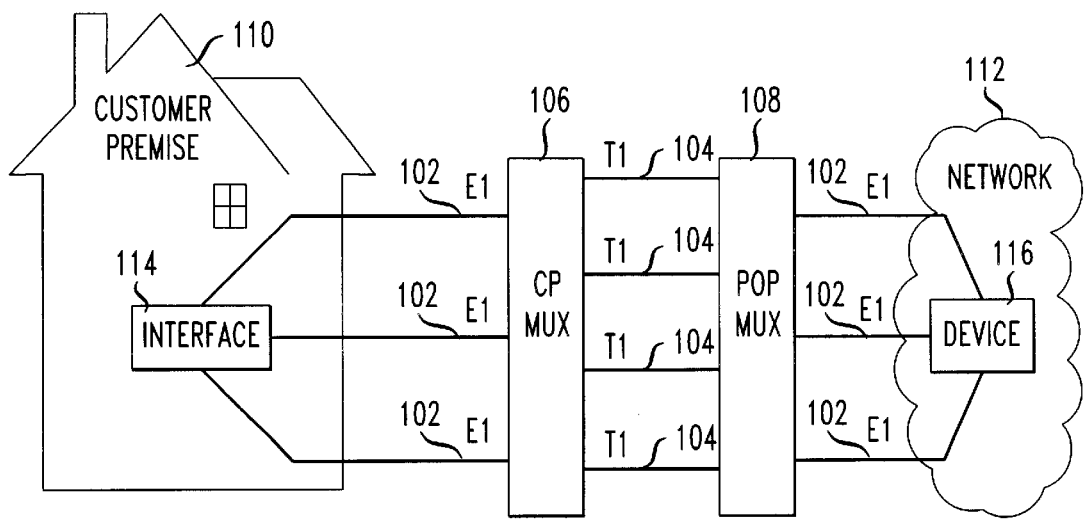
FIG. 1 is a block diagram of a system in accordance with an embodiment of the present invention.

FIG. 1 is a block diagram of a system in accordance with an embodiment of the present invention. In FIG. 1, a CP multiplexer (MUX) 106 comprises seven interfaces. Three interfaces 102 enable multiplexer 106 to exchange digital data (using three E1 lines, each comprising 32 64 Kbps channels) with a piece of equipment 114 associated with a CP 110 which might require an E1 interface. Examples of this piece of equipment (not shown in FIG. 1) include the following: a router, a frame relay switch, and another multiplexer. Four interfaces 104 enable multiplexer 106 to exchange digital data with POP multiplexer 108 using four T1 lines, each comprising 24 64 Kbps channels. The four T1 lines may be provisioned from the network 112 to the CP 110 by a local access provider.

POP multiplexer (MUX) 108 comprises interfaces similar to those described above with respect to CP multiplexer 106. In addition to comprising four interfaces 104 which enable POP multiplexer 108 to exchange digital data with CP multiplexer 106 using four 24 channel T1 lines, POP multiplexer 108 comprises three interfaces 102 which enable POP multiplexer 108 to exchange digital E1 format data with an E1-compatible network 112 (such as the AT&T network) using three E1 lines, each comprising 32 64 Kbps channels. More specifically, the three interfaces 102 of POP multiplexer 108 might be connected to a device 116 associated with network 112 such as an RC48 multiplexer associated with the AT&T network or the three interfaces 102 of POP multiplexer 108 might be connected to a multiplexer associated with a Sonet network.

Figure 2:
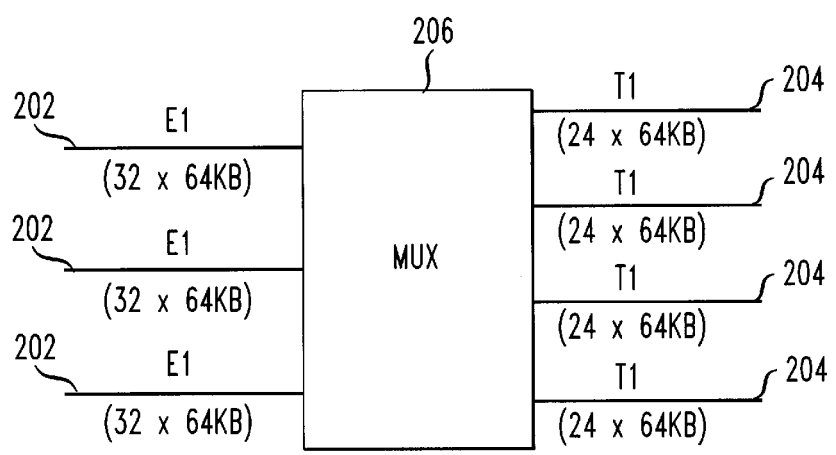
FIG. 2 is a block diagram of a multiplexer in accordance with an embodiment of the present invention.

FIG. 2 is a block diagram of a multiplexer in accordance with an embodiment of the present invention. In FIG. 2, multiplexer 206 comprises three interfaces 202 which enable multiplexer 206 to exchange E1 format data with another source using three E1 lines, each comprising 32 64 Kbps channels. Multiplexer 206 also comprises four interfaces 204 which enable multiplexer 206 to exchange digital data with another source using four 24 channel T1 lines.

The system of FIG. 1 operates as follows. CP MUX 106 receives E1 format digital data from a source at the CP 110. CP MUX 106 then maps each of the received 96 channels of E1 format data to one of the 96 channels provided by the four T1 lines. The digital data is then transmitted to POP MUX 108. POP MUX 108 maps the four T1 lines of digital data back onto three E1 lines. The digital data is then transported over the network 112. In a manner similar to that described above, the system of FIG. 1 may also be utilized to transmit E1 data in the reverse direction, that is, from network 112 to CP 110.

The system in accordance with the present invention reduces the number of multiplexers required at the CP and the POP. Rather than utilizing two multiplexers (one at the CP and one at the POP) for each E1 line at the CP, the present invention utilizes one multiplexer at the CP and one multiplexer at the POP regardless of the number of E1 lines at the CP. In addition to reducing the required number of multiplexers, the present invention is monetarily more cost-effective and less complex than the prior art methods for provisioning E1 service to a CP.

Although one embodiment is specifically illustrated herein, it will be appreciated that modifications and variations of the present invention are covered by the above teachings and within the purview of the appended claims without departing from the spirit and intended scope of the invention. For example, although the multiplexer of the present invention is described as having three E1 interfaces and four T1 interfaces, the present invention is intended to include multiplexers which include at least two E1 interfaces and at least three T1 interfaces such that the number of T1 channels is at least equal to the number of E1 channels.

What is claimed is:

1. A system for providing E1 access between a network and a customer premises, comprising:
   a first multiplexer; and
   a second multiplexer;
   wherein the first multiplexer and the second multiplexer each comprise:
      three thirty-two channel interfaces; and
      four twenty-four channel interfaces;
      wherein, in each multiplexer, each channel of the three thirty-two channel interfaces is mapped to a channel of the four twenty-four channel interfaces;
   wherein each of the four twenty-four channel interfaces of the first multiplexer is connected to one of the four twenty-four channel interfaces of the second multiplexer.

2. The system of claim 1, further comprising:
   a first device adapted to be connected to the three thirty-two channel interfaces of the first multiplexer; and
   a second device adapted to be connected to the three thirty-two channel interfaces of the second multiplexer.

3. The system of claim 2, wherein the first device is one of a router, a frame relay, and a third multiplexer; and
   wherein the second device is a third multiplexer associated with the network.

4. A multiplexer, comprising:
   three thirty-two channel interfaces; and
   four twenty-four channel interfaces;
   wherein each channel of the three thirty-two channel interfaces is mapped to a channel of the four twenty-four channel interfaces.

5. A method for providing E1 access between a network and a customer premises, comprising:
   receiving a first plurality of channels in a thirty-two channel format at three thirty-two channel interfaces of a first multiplexer;
   mapping, using the first multiplexer, each of the received first plurality of channels to an available channel associated with four twenty-four channel interfaces of the first multiplexer;
   receiving the mapped first plurality of channels at four twenty-four channel interfaces of a second multiplexer; and
   mapping, using the second multiplexer, each of the received mapped first plurality of channels to an available channel associated with three thirty-two channel interfaces of the second multiplexer.

6. The method of claim 5, wherein the first plurality of channels is received from one of a device associated with the customer premises and a device associated with the network.

7. The method of claim 5, further comprising the step of:
   sending the channels mapped using the second multiplexer to one of a device associated with the customer premises and a device associated with the network.

* * * * *